United States Patent [19]
Randmere et al.

[11] 3,963,868
[45] June 15, 1976

[54] LOUDSPEAKING TELEPHONE HYSTERESIS AND AMBIENT NOISE CONTROL

[75] Inventors: Uno Randmere, Victor; Morris A. Suntop, Rochester, both of N.Y.

[73] Assignee: Stromberg-Carlson Corporation, Rochester, N.Y.

[22] Filed: June 27, 1974

[21] Appl. No.: 483,591

[52] U.S. Cl. ............................ 179/1 HF; 179/1 VC
[51] Int. Cl.² ........................................ H04M 9/08
[58] Field of Search ............... 179/1 VC, 1 HF, 1 H, 179/170 R, 170 E; 235/193, 184; 328/137, 196, 197; 307/239, 241

[56] References Cited
UNITED STATES PATENTS

| | | | |
|---|---|---|---|
| 3,160,707 | 12/1964 | Meyers | 179/1 P |
| 3,363,061 | 1/1968 | Gardner | 179/1 P |
| 3,601,530 | 8/1974 | Edson | 178/5.8 |
| 3,644,674 | 2/1972 | Mitchell et al. | 179/1 P |
| 3,660,603 | 5/1972 | Anderson | 179/1 VC |
| 3,725,585 | 4/1973 | Moniak et al. | 179/1 HF |

FOREIGN PATENTS OR APPLICATIONS

| | | | |
|---|---|---|---|
| 668,858 | 4/1949 | United Kingdom | 179/1 VC |

OTHER PUBLICATIONS
Electronic Analog Computers, Ganino Korn, Ph.D., McGraw-Hill Book Company, 1956, pp. 13–26.

*Primary Examiner*—Douglas W. Olms
*Attorney, Agent, or Firm*—William F. Porter, Jr.; William A. Marvin

[57] ABSTRACT

A loudspeaking telephone system including voice switching is disclosed. The system is bistably voice controlled by inversely regulating the impedances of variolossers in the transmit and receive channels respectively. Further provision is made for switching additional impedance in parallel with each variolosser control to provide for a loud and a soft receiving mode. Hysteresis is added to the bistable control by the summation of receive and transmit signals across a plurality of unequal impedances that form part of a novel input control means. Circuitry forming the input control means also includes noise guard means useful in discriminating between ambient noise signals and syllabic speech signals. The noise guard circuit discriminates between noise signals and speech signals by producing an output whose amplitude is substantially related to ambient noise conditions while the noise guard circuit generally is not responsive to rapidly fluctuating voice signals. The output of the noise guard circuit is then summed with the transmit and receive signals across unequal impedances to prevent seizure of the bistable control by ambient noise.

7 Claims, 3 Drawing Figures

LOUDSPEAKING TELEPHONE HYSTERESIS AND AMBIENT NOISE CONTROL

BACKGROUND OF THE INVENTION

The present invention relates generally to voice switching in loudspeaking telephone systems and is more particularly directed to ambient noise supression in a bistable voice control with hysteresis.

A loudspeaking telephone or one that may be operated "hands free" is generally known in the art to include a microphone and transmitting channel connected to the input of a hybrid line transformer that is coupled to a telephone line, and a speaker and receiving channel connected to an output of the hybrid.

Generally the transmitting channel and receiving channel also contain means to provide gain for the signals flowing from the microphone or to the speaker. This gain in the receiving and transmitting signal amplitude and power may be accomplished in many ways with different types of electronic amplifiers including tubes, transistors, integrated circuits, and large scale integration.

One of the more common configurations is to provide the transmitting channel with a microphone pre-amplifier having high voltage gain and to then use its output to power a line driving amplifier having high current gain attached to the hybrid. Likewise, the receiving channel has a receive amplifier having a high voltage gain receiving an input from the hybrid and driving a speaker amplifier having enough current gain to ensure sufficient current to a speaker. There may be further matching or intermediate amplifiers or the transmit or receive amplifiers may have more than a single stage in either of the channels depending upon design.

This configuration, however, is unstable as the hybrid line transformer does not constitute a perfect balanced match to the telephone line. This mismatch causes leakage of part of the transmission signal into the receiving channel and its subsequent appearance as acoustic at the speaker. The microphone will then cause a regeneration of the signal through the system to establish a positive feedback loop and consequent instability.

The phenomenon is generally termed "singing" and occurs when the loop gain is greater than unity. The gain of the loop is equal to the gain of the receiving channel and the transmitting channel less hybrid loss and acoustic loss between the speaker and microphone. Thus, advantageously the circuitry should be designed to make the sum of the gains less than the sum of the losses around the loop.

The prior art generally attempts to solve this problem by "voice switching". The "voice switching" technique usually provides a control element which is bi-modal, being either in a transmission state or in a receiving state. While in one state the control will attenuate the gain of the channel not being used so the loop gain will be less than unity.

Attenuation of the channel gain in a loudspeaking telephone is generally accomplished by increasing the impedance or loss in a series element in the channel or decreasing the gain of one or more of the amplifiers in the channel. When the control switches states, the channel not being used is restored to full gain while the other channel's gain is decreased. Essentially the operation becomes bistable with one state being a receiving mode with the transmitting channel muted and the other being a transmission mode with the receiving channel muted.

The control element in "voice switching" has its state changed from transmission mode to receiving mode and vice versa by signals provided from the channels indicating the direction of seizure needed. Acoustic energy which is transduced by the microphone into an electrical signal is transmitted to the control which in turn indicates the desire to seize the control of the transmission channel, while an input from the hybrid results in the transmission of an electrical signal to the control which indicates the desire to seize the control for the receiving channel.

Although "voice switching" substantially solves the problem of singing in loudspeaking telephones, a number of other problems associated with its operation are of concern.

One such problem is echo which may be picked up by the microphone from the sound produced by the speaker in a reverberant environment and re-transmitted to the connected station over the telephone line. This phenomenon occurs when the inherent mechanical delay caused by the energy being reflected from a surface is of sufficient magnitude to cause the tripping of the control into its transmitting mode.

Echo may cause at least two undesirable results at the transmitting station. One result is that of a re-echo which again causes re-transmission with the possibility of causing instability within the system. Another undesirable result is the disconcerting effect echo has upon the individual speaking into the telephone. It is known in the prior art that the longer the delay the more disconcerting the echo becomes to that individual.

In addition to the echo problem in voice switching, premature seizure of a mode during syllabic pauses in the received speech may occur when there are simultaneous vocalizations (double talking) by both parties to a conversation or when ambient noise causes a transmit seizure at the receiving station during a pause in the conversation.

In the event of premature seizure, a rapid switching of the control from state to state and a clipping of each syllable transmitted often takes place. The clipping is caused by the time delay required by the control to transmit each new syllable after a change of state. The transmitting station will receive flutter static and the received speech will sound choppy because of this clipping.

Premature seizure may be eliminated by preventing the bistable control from switching at the same transmit and receive levels by providing different switching levels for switching into the transmit and receive modes. The difference between the switching levels is termed hysteresis and in operation results in an overtake of a predetermined minimum magnitude which the bistable control must recognize before it changes states.

The prior art discloses the use of an artificial gain parameter generated by an amplifier to produce hysteresis to bistably switch the gain of the amplifiers. Such prior art apparatus is susceptible to feedback instability problems as it connects the output of an amplifier to its input.

Also, the hysteresis technique developed in the prior art may not be utilized in systems that use variable impedances instead of variable gain amplifiers for the switchable gain degraders in each channel because such impedances cannot generate an artificial gain "parameter".

Another problem in prior art voice controlled loudspeaking telephones with hysteresis has been poor overtake performance. Mainly the problem is caused by ambient noise conflicting with the receiver channel signal for seizure of the bistable control. The noise may hold the circuitry in the transmission mode even though transmission has been completed by one party and the other party begins talking.

It would be advantageous to eliminate the noise parameter from the transmitted signal and to eliminate any other spurious parameter from either of the transmit and receive signals that is generated by the transmit signal to prevent such poor overtake performance. One such parameter is the signal generated by the hybrid (due to the leakage described above) which is combined with the received signal and if transmitted to the control circuitry further effects system performance by causing "breakthrough" blocking.

The reception of faint signals — which, for example, may be encountered on lines that are connected to a plurality of first stations that are relatively close to each other and to a plurality of second stations that are relatively distant, from the first stations — has been still another problem in voice switched loudspeaking telephones. If the receiving channel has sufficient gain to amplify faint signals to a reasonable power level and a control sensitive enough to respond to the amplified signals, then strong signals will be amplified to a level which is uncomfortably loud and any hysteresis provided in the system will be ineffective.

The prior art has attempted to overcome this problem by the introduction of limitors and various types of automatic gain control ("AGC") circuits which may cause further problems such as "AGC bursting". What is actually needed is a simplified way of increasing the receiver gain for substantially all faint signals below a certain signal level so that they may produce a reasonable audio level at the speaker without detrimentally affecting the voice control sensitivity.

BRIEF DESCRIPTION OF THE INVENTION

The invention provides a simplified way of producing a variable hysteresis in voice controlled systems using either variable gain amplifiers or controlled impedances. Control input means of the invention include means for providing seizure commands by comparing transmit and receive levels in summing circuitry and circuit means for providing a bistable control output which depends upon which level is greater.

One summing means performs an analog addition of the transmit and receive signals formed by peak detecting means across unequal impedances while the other summing means performs an identical analog addition across impedances equal in value, but oppositely connected. Thus, each summing means or junction has impedances of $Z_1$ and $Z_2$ and where the transmit signal is connected to $Z_1$ on the one summing junction and to $Z_2$ on the other, while the receive signal is connected to the $Z_2$ on the first junction and $Z_1$ on the other.

If the bistable control is in one state then, in order to change states, a signal of opposite polarity must overtake the controlling signal by a predetermined amount which is dependent upon the ratio of $Z_1$ and $Z_2$.

Therefore, the control input means of the invention provides a means for direct comparison of the transmit and receive levels by passive elements. The control input means does not change any of the design parameters of the loop nor is it dependent upon the parameters as the only inputs are the transmit and receive levels. Since the control input means is not affected by the loop parameters it may be used either in passive variolosser systems or in active variable gain systems without loss in performance. Also the hysteresis level may be adjusted easily by ganging the impedances between summing means without affecting the loop gain and receiver sensitivity simply by changing the ratio between $Z_1$ and $Z_2$.

The invention further provides noise guard means to substantially eliminate the noise and hybrid parameters from the control input means without substantially affecting the sensitivity of the transmit and receive channels. This feature allows the control input means to recognize the differences between ambient noise and syllabic speech and to prevent the holding of the transmit channel by ambient noise. By being to discriminate between noise and speech, the loudspeaking telephone system is capable of more extensive use in high ambient noise environments.

The noise guard means developes a signal equal in amplitude with respect to a reference and opposite in polarity from the signal developed by the peak detecting means of the transmit signal. When there is a pause in the speech, the noise guard signal, due substantially to ambient noise, and the transmit signal will be equal. The noise guard signal is then inversely summed in the transmit summing means through another impedance $Z_3$, which is equal to the transmit impedance, to cancel the noise parameter from the control input means.

Speech energy will cause the transmit peak detecting means to follow rapidly because of a relatively fast time constant and cause the noise guard means to remain substantially unchanged because of a relatively long time constant thereby allowing speech to pass freely into the transmit channel and control while cancelling the noise parameter. The noise guard means not only cancels the noise parameter from the control input means but also the hybrid parameter produced by leakage of the noise across the line transformer. The noise guard signal is summed in the receive summing means across an impedance $Z_4$. In order to substantially cancel out the noise parameter in the receiving summing means, the magnitude of the impedance $Z_4$ should be less than the transmit impedance since the apparent magnitude of the receive signal is exaggerated because of the hybrid parameter. The noise guard means (by providing this inverse signal) is therefore effectively used to cancel the noise and hybrid parameter to the control input means and permit the usage of the loudspeaking telephone system in a high ambient noise environment.

Another feature provided by the invention is sensitive gain control means allowing receiver signals above a certain level to switch the control input means and, if the receiver signals are not of sufficient audio level, to increase the gain of the receiving channel without substantially changing loop performance.

Gain control means are provided and include switching means adapted for increasing the gain of the receiving channel while simultaneously increasing the losses around the loop by the same amount to maintain the equivalent margin of stability.

Accordingly, therefore, it is an object of the invention to provide hysteresis for a voice control by a direct comparison of the transmit and receive levels.

Further, it is an object of the invention to provide noise guard means for substantially cancelling the noise and hybrid parameters from the control input means, thereby providing extended operation in a high ambient noise environment.

Still further, it is an object of the invention to provide receive sensitivity for faint signals without substantial loop parameter changes.

Many other objects, features and advantages of the present invention will be clearer and more fully understood from the following detailed description of a preferred embodiment thereof, when read with the appended drawings 1–3 wherein:

DETAILED DESCRIPTION OF THE PREFERRED EMBODIMENT

Figure 1:
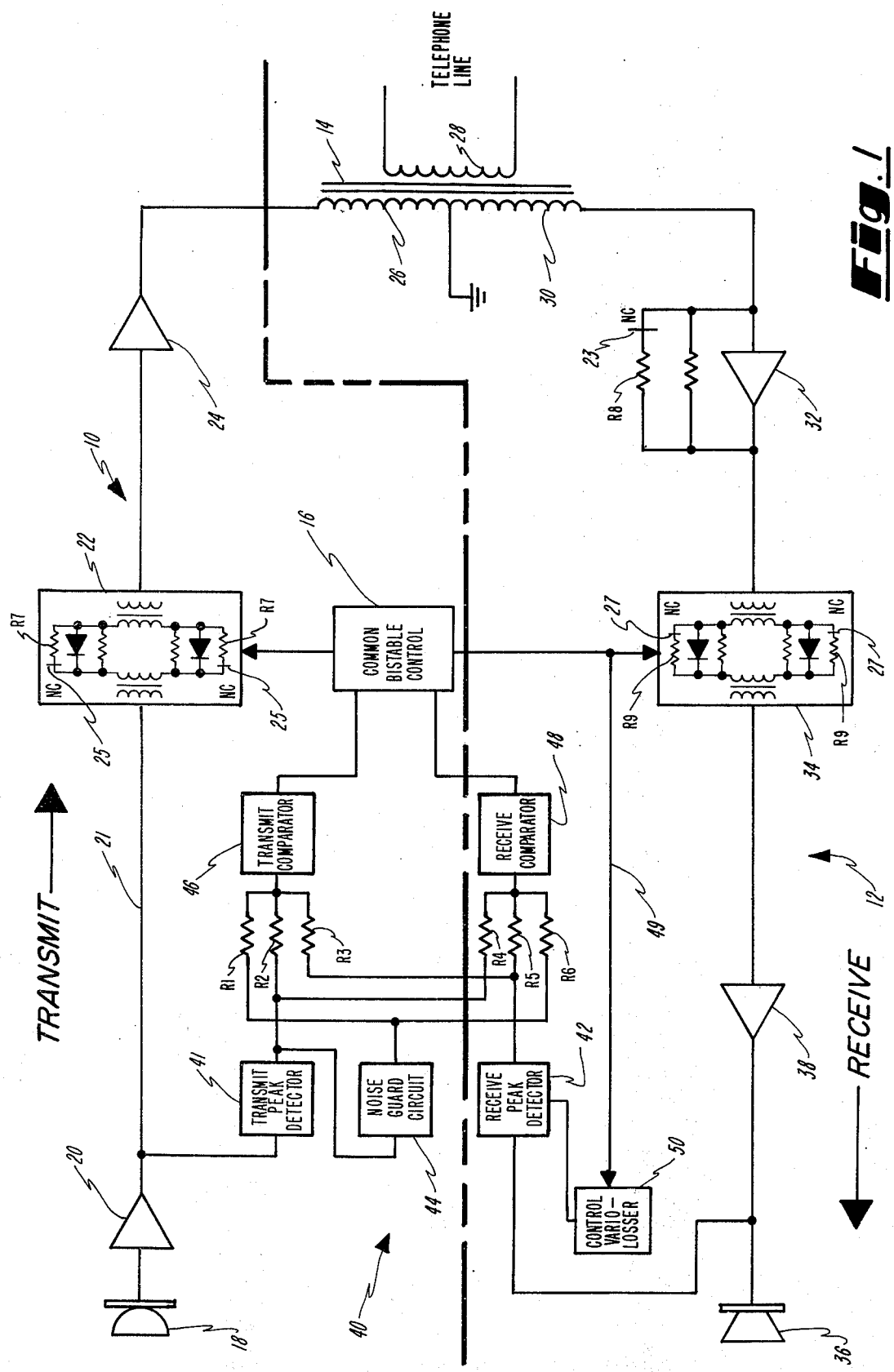
FIG. 1 is a diagram, partially in block form and partially in schematic form, of a loudspeaking telephone system with bistable voice control constructed in accordance with the present invention.

Referring now to FIG. 1, there is shown a loudspeaking telephone system including a transmission channel 10 and a receive channel 12. Both channels share a hybrid line transformer 14 and a common bistable control circuit 16.

The transmission channel 10 includes, a microphone 18 which drives a microphone pre-amplifier 20 which amplifies the voltage output of the microphone 18. The output of the pre-amplifier 20 is transmitted via line 21 to a transmit variolosser (TVL) 22, the impedance of which is variable with respect to a control signal from the bistable control 16 and dependent upon the state or mode of the bistable control 16. The TVL 22 has parallel impedances R7 balanced and selectively switchable into the circuit. The output of the TVL 22 is amplified by a current amplifier 24 which produces sufficient current and power increase to drive the input secondary winding 26 of the hybrid 14. The output signal of the hybrid 14 is propagated to a telephone line and central switching equipment (not shown) by the primary windings 28 of the hybrid 14.

Conversely, signals to be received from the telephone line by the receiver channel 12 are transmitted through the hybrid 14 to output secondary windings 30. The output of secondary windings 30 is amplified by voltage amplifier 32 (the gain of which may be varied by selectively switching an impedance R8 in and out of parallel with the amplifier 32) and applied to a receive variolosser (RVL) 34, the impedance of which is variable with respect to a control signal from the bistable control 16 and dependent upon the state or mode of the bistable control 16, as will be described in greater detail below. The RVL 34 also includes parallel impedances R9 balanced and selectively switchable into the circuit. The output of the RVL 34 is transmitted to a speaker amplifier 38 which drives a speaker 36.

Associated with the bistable control 16 are control input circuits generally designated 40 (including transmit and receive peak detectors 41 and 42, respectively, noise guard circuit 44, transmit and receive comparators 46 and 48 and a control variolosser 50) for determining the state of the bistable control 16. The control input circuits 40 determines the mode to which bistable control 16 will make a transition by processing signals from the transmission and receiver channels 10, 12.

Signals in the transmission channel 10 are sampled at the output of the microphone pre-amplifier 20 by transmit peak detector 41 and signals in the receive channel are sampled at the output of the speaker amplifier 38 by the receive peak detector 42. Further, a noise guard signal is developed (as will be discussed in greater detail below) from the output of the transmit peak detector 41 by a noise guard circuit 44.

The outputs of the receive peak detector 42, transmit peak detector 41, and noise guard circuit 44 are summed across a transmit summing circuit R1, R2, R3 to define the input to a transmit comparator circuit 46 and across receiver summing circuit R4, R5, R6 to define the input to a receive comparator circuit 48.

The common bistable control 16 which receives inputs from the transmit comparator 46 and the receive comparator 48, switches between transmit and receive modes depending upon which of comparators 46 and 48 has generated a seizure command, and has an output via a line 49 which actuates a control variolosser 50 to switch the gain of the receive peak detector 42 between values corresponding to the transmit and receive modes, respectively, of the common bistable control 16.

The detailed system operation may be advantageously understood by describing the transition of the system from a transmitting state to a receiving state. In the following detailed discussion, with reference to FIGS. 2 and 3 (which show the detailed connection and components within the circuits represented by blocks in FIG. 1), of the loudspeaking telephone system, the same reference numerals will be utilized for the components and circuitry which are identical to those shown in FIG. 1.

When the system is operating in a transmitting state, the bistable control 16 causes the TVL 22 to insert a low loss into the transmit channel 10 and the RVL 34 to insert a high loss into the receive channel 12. This loss difference between high and low for the variolossers 22, 34 is approximately 23 db with the nominal low loss being 0 db and the nominal high loss being 23 db. As will be explained in greater detail below, when the system is in the transmitting state, the bistable control 16 supplies a control signal to the RVL 34, switching the RVL 34 to the higher loss state, while releasing the TVL 22 to its quiescent low loss state. The control signal from the bistable control 16 (transmitted via control variolosser 50) also increases the gain of the receive peak detector 42 by an amount comparable to that lost through the RVL 34 to retain the sensitivity of the control input circuits 40.

When the system is in the transmission state, signals from the microphone are readily propagated through the transmission channel 10 while the receive channel is essentially muted. To provide for transition of the bistable control 16 into the receive state, the control input circuits 40 compares the levels of the signals from the transmit and receive channel 10, 12 and determines when the level of signals on the receive channel is great enough for a state change. The levels of the receive and transmit signals that are directly compared in summing circuit R1–R6 are developed by the peak detectors 41, 42 which sample the transmit and receive signals from the transmission and receiving channels 10, 12 respectively, and have outputs that are combined by analog addition in the summing circuits R1–R6. The levels produced are substantially related to the peak voltage of each signal and follow the peak signals relatively closely. The ability to follow the rapidly variable transmit and receive audio signals is related to the attack and release times of the peak detectors 41, 42 which are nominally less than 15 milliseconds attack and 350 ± 50 ms release time.

The transmit and receive levels, which are of opposite polarity, are then summed across unequal impedances R2, R3 for the transmit comparator circuit 46 and R4, R5 for the receive comparator circuit 48 (where R2 ≠ R3 and R2 = R5, R3 = R4). These unequal impedances produce a hysteresis that is proportional to the ratio between R2 and R3 by the analog addition of the transmit and receive signals across the summing means R1–R6. The hysteresis produced by the impedances is recognized as an overtake differential by comparators 46, 48. Each comparator 46, 48 takes the analog sum of the signals input and produces a seizure command only if the signal to seize the bistable control 16 exceeds the controlling level by the overtake differential. The seizure command is the signal that produces the mode transition of the bistable control.

For example, to switch the system into a receiving mode with a nominal hysteresis of 5 (R5 = 5R4) and a transmit signal of 0.5 volts the input to the receive comparator circuit 48 must be a receive level greater than 2.5 volts before a receive seizure command will be given. Only the receive comparator 48 may seize the system for receiving and, likewise, only the transmit comparator 46 may seize the system for transmission.

The noise guard circuit 44 substantially eliminates the ambient noise parameter from the transmit level produced at the transmit peak detector 41 by inverting the output of the transmit peak detector 41 and transmitting the inverted signal to the transmit summing means R1–R3 via R1.

When there are no audio signals transmitted by microphone 18, the transmit signal being substantially cancelled by the combination of R1, R3, which are equal, because it is produced only by ambient noise. However, when audio signals are present in the transmit channel, the peak detector 41 follows the waveform rapidly, while the output of noise guard circuit 44 is relatively unchanged because its attack time is much greater than that of the peak detectors 41, 42. The nominal rate is two sec ± ½ sec for attack and less than 10 milliseconds release. The noise guard circuit 44, which takes advantage of the fact that voice signals are normally louder than ambient noise signals, thus provides a facile method and apparatus for eliminating the noise parameter from the control circuitry in effecting a transmit seizure.

The noise guard circuit 44 also substantially cancels the noise parameter from the receive comparator circuit 42 by its insertion across R6 in the receive summing circuit R4–R6. In order to optimize this cancelling, the impedance of R6 should be greater than the transmit impedance R4 because of the hybrid parameter leakage that takes place at the transformer 14 and makes the receive signal level appear greater than it actually is. If R4 were equal to R6, the receiver channel would be too sensitive and always switched in the receiving state.

The system also includes provisions for loud and soft control by increasing the gain of the receiver channel 12 without significant loss of performance due to loop gain changes. The receiver gain is increased by opening a normally closed contact 23 in order to remove the impedance R8 from the receiver amplifier circuit 32 thereby increasing the amplifier gain by a nominal 10 db. Simultaneously with this operation additional 10 db losses are inserted into the variolossers TVL 22, RVL 34 by opening normally closed contacts 25, 27 and removing parallel impedances R7, R9, respectively, from their circuitry respectively. System stability is maintained since the receiver gain is cancelled by the additional loss in the TVL 22 when in the receiving mode and by the additional loss in the RVL 34 when in the transmission mode. The normally closed contacts 23, 25, 27 may be any type of simultaneously operating SP5T switch, such as relay contacts of relay K2 in FIG. 2.

Figure 2:
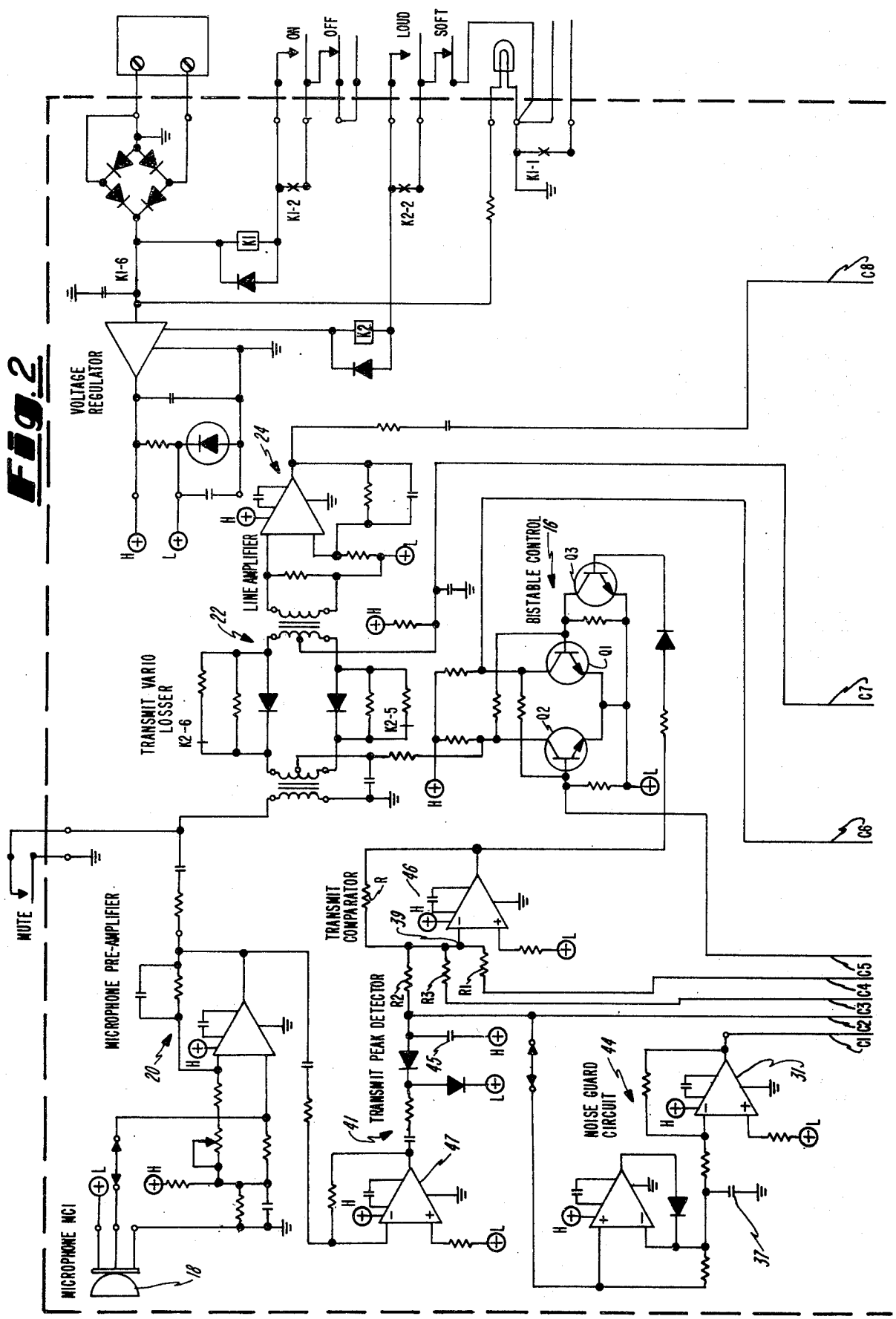
FIG. 2 is a detailed schematic diagram of a preferred embodiment of the transmit portion of the system.
Figure 3:
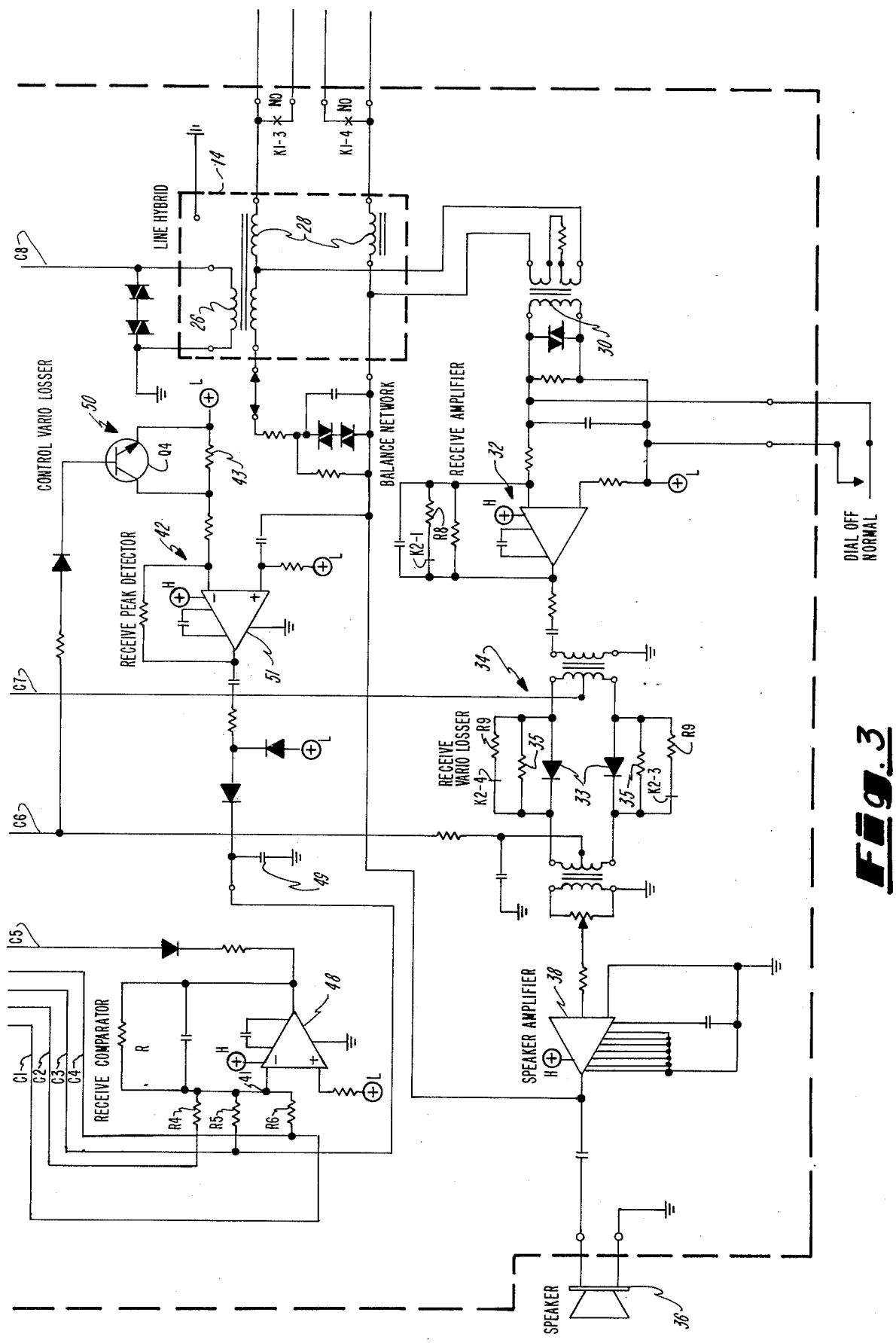
FIG. 3 is a detailed schematic diagram of a preferred embodiment of the receive portion of the system.

Attention should now be directed to the schematic diagrams of FIGS. 2 and 3 which show detailed components and connections of an embodiment of the system shown in FIG. 1. The power supply, voltage regulator, operator switches, and indicating lamp shown in FIG. 2 are all elements well known in the art and no further discussion of these is deemed necessary.

BISTABLE CONTROL

The bistable control 16 is comprised of NPN transistors Q1, Q2 differentially connected between high and low voltage supply. A control transistor Q3, which is arranged to be switched by the output of the transmit comparator circuit 46, has its collector and emitter connected to the bases of transistors Q1 and Q2, respectively. During the transmission mode of operation Q1 is switched off by the control transistor Q3, Q2 is switched on and shunts bias from TVL 22, while a positive bias is presented to RVL 34. This is the transmission mode and is controlled by the transmit comparator seizure command turning Q3 on.

If on the other hand, the receive comparator 48 gives a seizure command, Q2 is switched off and permits a positive bias to be supplied to the TVL 22 and Q1 is switched on and shunts bias from RVL 34. Thus it is seen by turning either Q1 or Q2 off according to the particular seizure command a transition between modes of operation will take place.

The transmit seizure command which turns Q2 off occurs only when the voltage applied to the base of Q3 is greater than the low voltage supply. Therefore, the transmit comparator 46 generates a transmit seizure command only when its output is more positive than the low voltage supply. The receive comparator 48 generates a receive seizure command only when its output (to the base of Q1) is less positive than the low voltage supply.

CONTROLLED VARIOLOSSERS

TVL 22 and RVL 34 are controlled impedances that provide greater impedance (or more loss) in response to a positive bias from the bistable control 16. The operation RVL 34 will now be described and is exemplary of the operation of the TVL 22. When the RVL 34 is in a low loss state audio signals pass readily through diodes 33 and are not attenuated. However, when a positive bias is applied to the RVL 34 the diodes 33 are reversed biased and the audio signal is forced across the parallel combinations of impedances 35 and R9 causing significant attenuation of signal amplitude. R9 may be switched out of the parallel combination to increase the losses caused by the impedances 35. Each impedance of the RVL 34 is substantially identical on either side of the center taps to provide balanced attenuation to the system.

TRANSMIT PEAK DETECTOR

The transmit peak detector 41 provides a signal level that is substantially related to the output audio signal transmitted from the microphone pre-amplifier 20. The peak detector 41 establishes this level by charging a capacitor 45 with a voltage amplifier 47. A bias on the capacitor 45 allows the level to swing below the low supply depending upon the peak amplitude of the audio input. The steady state level for the capacitor 45 is the low voltage supply.

RECEIVE PEAK DETECTOR

The receive peak detector 42 provides a signal level that is substantially related to the output audio signal transmitted from the speaker amplifier 38. The peak detector 42 establishes this level by charging a biased capacitor 49 with a voltage amplifier 51. A bias on the capacitor 49 allows the level to swing above the low supply voltage depending upon the peak amplitude of the audio input. The steady state level for the capacitor 49 is the low voltage supply.

The differences in the circuits used in biasing capacitors 45, 49 are provided to cause the transmit level to swing to one side of the low supply voltage and to cause the receive level to swing oppositely. The inverting input on amplifier 47 is utilized to obtain the correct polarity for the signals level of the transmit mode while the non-inverting input is utilized on the amplifier 51 to obtain the correct polarity for receiving mode.

CONTROL VARIOLOSSER

The control variolosser 50 increases the gain of the receive peak detector 42 by shunting an impedance 43 with an NPN transistor Q4. This gain increase is effected by providing a positive bias to Q4. The positive bias is also used to increase the loss of RVL 34. The increase in gain of the receive peak detector 42 cancels the loss of signal to the control variolosser 50 caused by the switching of RVL 34.

COMPARATORS

Both comparators 46, 48 include amplifiers whose outputs may vary between ground and the high supply voltage and have an operating point at the low supply voltage. The inverting inputs of each comparator 46, 48 are connected to the summing circuits R1–R3, R4–R6, respectively.

A transmit seizure command is generated by the transmit comparator 46 only when the analog addition of the voltages into the transmit summing means R1–R3 is less than the low supply voltage and, conversely, a receive seizure command is generated by the receive comparator 48 only when the analog addition of the voltages into the receive summing means R4–R6 is greater than the low supply voltage. Since the impedances R3, R2 are unequal, the transmit level (below the low level supply) must exceed the receive level (above the low level supply) by the overtake (differential) level before a transmit seizure can be effected and vice versa for receive seizure. The overtake (differential) level of each comparator 46, 48 is provided by the unequal gains in the transmit and receive levels because of the unequal impedances which the corresponding signals are summed across. For example, for any impedance R the gain of the transmit comparator 46 for transmit levels is R/R2 and for receive levels is R/R3. The ratio of the gains R2/R3 then becomes the overtake level and may be expressed in db.

NOISE GUARD

The noise guard circuit 44 provides a level generally equal to the ambient noise signals contained within the transmit voltage level. A slower attack time for the charging capacitor 37 is used to discriminate between rapidly varying audio signals and relatively invarying ambient noise. The correct cancelling polarity is produced by the inverting amplifier 31 which has a gain of unity. The cancelling voltage is used to eliminate the noise parameter from both summing circuits R1–R3, R4–R6 impedances R1, R6. R6 and R4 are not equal because of the hybrid parameter leakage which increases the received signal.

It will be understood by those skilled in the art that numerous variations and modifications may be effected to the perferred embodiment without departing from the spirit and scope of the invention as hereinafter claimed.

What is claimed is:

1. For use in a loudspeaking telephone system including transmit and receive channels, a control circuit for switching between said transmit and receive channels, comprising:

a. selection control means responsive to transmit and receive seizure commands for effectively selecting between said transmit and receive channels, respectively, by reducing the gain of the unselected channel, b. input control means for producing said receive seizure commands and said transmit seizure commands, said input control means including:

c. a first means for deriving a first d.c. input control signal which varies in accordance with the signal level in the transmit channel, and a second means for deriving a second d.c. input signal which varies in accordance with the signal level in the receive channel, d. transmit comparator means and receive comparator means for producing, respectively, receive and transmit seizure commands, e. transmit summing junction means connected to operate said transmit comparator means, said transmit summing junction means comprising a first set of at least a first and a second summing impedances connected to a common junction point, the magnitude of impedance of said first summing impedance being larger than that of said second summing impedance, said transmit summing junction means being operative to apply said first d.c. input control signal to said junction point through said first summing impedance and to apply said second d.c. input control signal to said junction point through said second summing impedance, the respective d.c. input control signals being applied to said junction point in opposed d.c. polarity relationship to one another, and f. receive summing junction means connected to operate said receive comparator means, said receive summing junction means comprising a second set of at least a third and a fourth summing impedances connected to another common junction point, the magnitude of impedance of the third summing impedance being larger than that of said fourth summing impedance, said receive summing junction means being operative to apply said second d.c. input control signal to said another junction point through said third summing impedance and to apply said first d.c. input control signal to said another junction point through said fourth summing impedance, the respective d.c. input control signals being applied to said another junction point in opposed d.c. polarity relationship to one another.

2. A control circuit in accordance with claim 1, wherein;
   a. said transmit summing junction means is arranged to provide an actuation signal for causing said transmit comparator means to produce a transmit seizure command when the signal level in said transmit channel exceeds the signal level in said receive channel by a predetermined factor, and
   b. said receive summing junction means is arranged to provide another actuation signal for causing said receive comparator means to produce a receive seizure command when the signal level in said receive channel exceeds the signal level in said transmit channel by another predetermined factor,
   c. the respective predetermined factors being proportional to the ratio of the magnitude of the first summing impedance relative to the second summing impedance, and to the ratio of the magnitude of the third summing impedance relative to the fourth summing impedance, respectively.

3. A control circuit in accordance with claim 2, wherein;
   a. the ratios of the magnitude of the first summing impedance relative to that of the second summing impedance, and of the magnitude of the third summing impedance relative to that of the fourth summing impedance are equal.

4. A control circuit in accordance with claim 1, wherein;
   a. each of said first, second, third and fourth summing impedances is a resistor.

5. A control circuit in accordance with claim 1, wherein;
   a. said input control means further includes a third means for deriving a third d.c. input control signal which varies in accordance with the noise level in said transmit channel, and
   b. said transmit summing junction means further includes a fifth summing impedance operative to apply the third d.c. input control signal to the junction point of the transmit summing junction means, the first d.c. input control signal and the third d.c. input control signal being applied to said junction point in opposed d.c. polarity relationship to one another, and said receive summing junction means further includes a sixth summing impedance operative to apply the third d.c. input control signal to the another junction point of the receive summing junction means, the first d.c. input control signal and the third d.c. input control signal being applied to said another junction point in opposed d.c. polarity relationship to one another.

6. A control circuit in accordance with claim 5, wherein;
   a. said transmit and receive channels are coupled to a two-wire transmission line through a hybrid-type balancing network, and
   b. the magnitude of impedance of said fifth summing impedance is greater than that of said sixth summing impedance to thereby compensate for an undesired component of noise present only in the receive channel due to a mismatch between the two-wire transmission line and hybrid-type balancing network.

7. A control circuit in accordance with claim 5, wherein;
   a. said means for deriving a third d.c. input control signal includes a charging capacitor circuit having a predetermined attack time chosen to cause said third means to be nonresponsive to audio signals in the transmit channel.

* * * * *